INVENTOR
Robert E. Meynig

INVENTOR
Robert E. Meynig

United States Patent Office 3,380,389
Patented Apr. 30, 1968

3,380,389
TIME CYCLE ACTUATOR
Robert E. Meynig, Rte. 2, Box 170–A,
Tyler, Tex. 75701
Filed Apr. 18, 1966, Ser. No. 543,412
20 Claims. (Cl. 103—50)

ABSTRACT OF THE DISCLOSURE

An actuator comprises a first valve means adapted for movement from a first activated state to a second state over a predetermined time interval to maintain a source of pressurized fluid closed off, an activator operative responsive to the fluid pressure to activate the first valve means to the first state, and a second valve means operative responsive to the fluid pressure when opened to apply pressure to the activator and release the pressure therefrom after another predetermined time interval.

Figure 1:
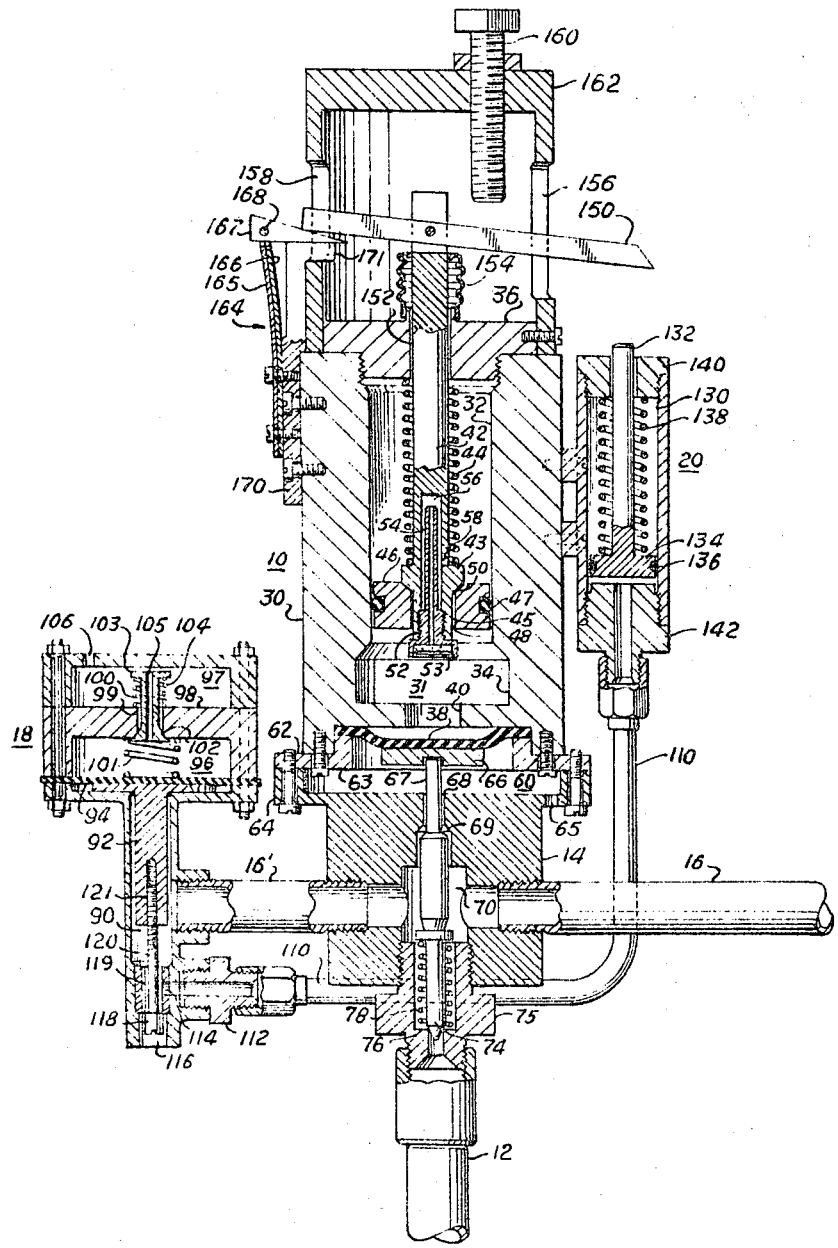

There are many applications for devices or mechanisms that are variously referred to as timers, actuators, intermitters and automatic valve systems for automatically controlling the opening and shutting of a valve connected between a source of fluid and a conduit to which is connected a mechanism operated in response to fluid pressure. For example, sources of pressurized natural gas are readily available in the oil field and are utilized to operate various oil field equipment, such as employing a source of high pressure natural gas to gas lift oil within a well. To operate a gas lift well, the high pressure gas must be intermittently released from the pressurized source and applied to the well. Actuators or intermitters that are available for controllably releasing gas from a pressurized source are usually characterized by manually wound clock mechanisms that require periodic attendance.

Another particular application for an intermitter or actuator in oil production is to control the injection of various chemicals into collector stations, primarily for promoting the separation of the production from the well into oil, gas and water. The most commonly used actuators for this purpose are characterized by a piston arrangement that is continuously reciprocated and subjected to substantial wear. Only small amounts of chemical are usually required so that operation of these systems at a slow rate would be desirable. However, these systems are generally inaccurate and become inoperative at slow speed operation, and thus are operated considerably faster, causing costly excesses of the chemical to be used.

It is an object of the present invention to provide a time cycle actuator or automatic valve means adapted for connection to a source of pressurized fluid that is operated in response to the pressure from the source to recurrently release the fluid from the source. It is also an object to provide such an actuator that is completely automatic and is characterized by an absolute minimum of wear of the components used therein, so as to provide a very simple, automatic and reliable actuator that operates solely in response to the pressure of the fluid within the source in which it is adapted to release. A further object is to provide such an actuator that maintains a very accurate time cycle of operation.

In accordance with these objects, the invention provides an actuator that comprises a first valve means for connection to a source of pressurized fluid that is adapted for activation to a first state to assume a second state a predetermined time interval after it is released from the first state so as to maintain the source of pressurized fluid shut off during the transition from the first to the second state. When the first valve means attains the second state, it opens the source of pressurized fluid into a chamber to which any mechanism for being operated responsive to fluid pressure can be connected. An activator is employed to activate the first valve means from the second state to the first state in response to fluid pressure applied thereto, and maintain the first valve means in the first state as long as pressure is applied to the activator. A second valve means is connected to the first valve means for transmitting fluid under pressure from the source to the activator when the source is opened by the first valve means. The second valve means is also operated responsive to the fluid under pressure from the source and automatically releases the pressure from the activator a predetermined interval of time after its operation is initiated, thus allowing the first valve means to be released from its first state. The actuator then recycles.

A preferred embodiment of the actuator employs a piston operated valve as the first valve means which is activated to a first position and biased to move to a second position through a viscous fluid medium to create fluid pressure on a diaphragm to maintain a source of pressurized gas shut off. When the pistons attain the second position, the source of gas is opened. The second valve means comprises a piston type valve operated in response to fluid pressure applied to another diaphragm, wherein the second valve means transmits gas pressure from the source to the activator until the piston valve closes off. This diaphragm also operates within a viscous fluid medium, and closes after the piston of the second valve means moves from a first to a second position. The various time intervals of the two valve means can be adjusted over relatively wide ranges, with typical times ranging from a few seconds to several minutes or hours. Normally, the gas source is opened only for a few seconds during each cycle, whereas it is closed off for several minutes, or the remainder of the cycle. It will be apparent that the components of the actuator are subjected to virtually no wear because of the time intervals involved and the relatively slow movements of the pistons. Moreover, the actuator time cycle can be made very accurate by virtue of its construction, all as will become apparent below.

Figure 2:
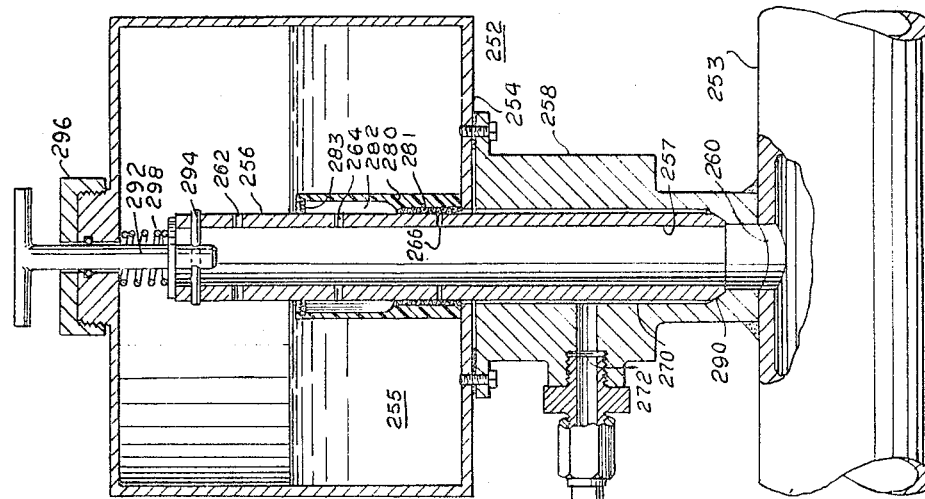
Figure 2:
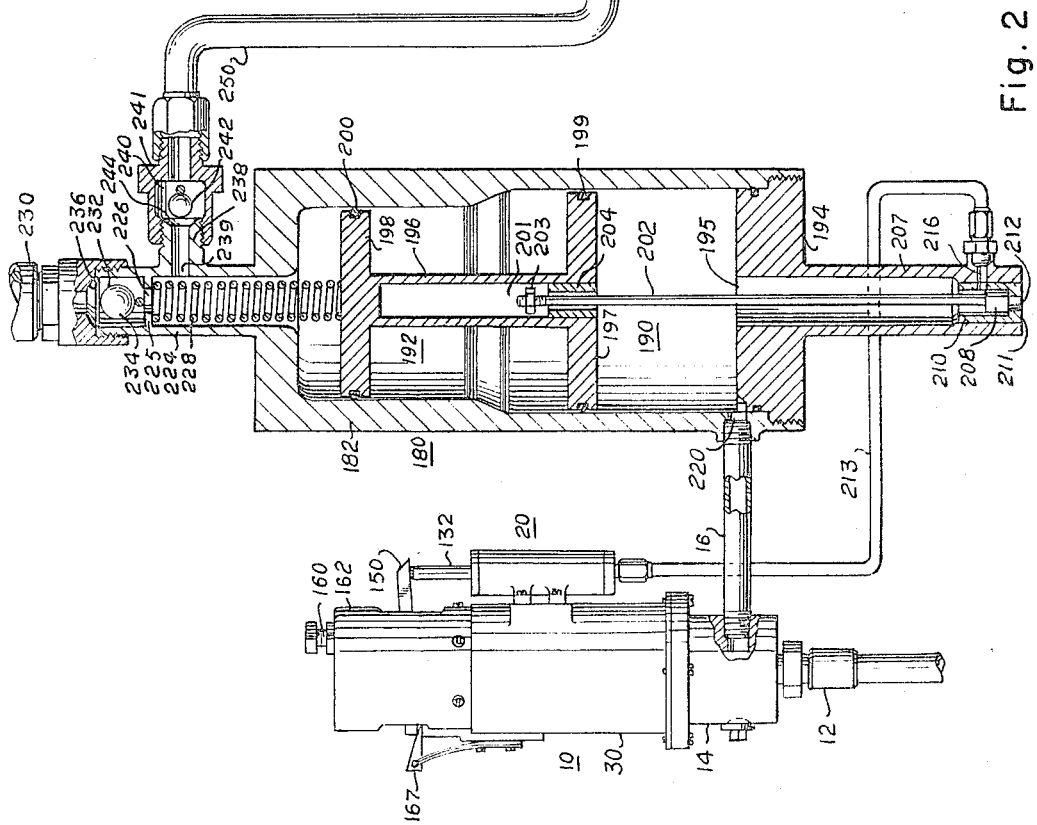

Other objects, features and advantages of the invention will become readily apparent when taken in conjunction with the appended claims and the attached drawing wherein like reference numerals refer to like parts throughout the several figures, and in which:

FIGURE 1 is a side elevational view, partly in section, of one embodiment of the actuator of the invention; and FIGURE 2 is a side elevational view, partly in section, of another embodiment of the invention that has particular application to the pumping of a liquid from a source at a controlled rate.

One embodiment of the actuator of the invention is shown in the side elevational view, partly in section, of FIGURE 1. The actuator comprises a first valve means, designated generally at 10, adapted for connection to a source of pressurized gas (not shown) through an outlet 12 of the source. A chamber 14, forming a part of the first valve means is adapted for connection to a conduit 16, whereby the actuator of the invention functions to recurrently release gas automatically from the source outlet 12 into the conduit to operate any gas pressure operated mechanism (not shown) that is connected to the conduit. That is to say, the actuator will open source outlet 12 to the conduit 16 for a predetermined period of time, shut the source off after this interval and maintain it closed for another predetermined period of time, and then continuously repeat this cycle. The valve means 10 is adapted for activation to a first state to assume a second state a predetermined interval of time after being released from the first state, and maintains the source outlet 12 closed off from conduit 16 during the transition from the first state to the second state. When the valve means 10 attains the second state, the gas source outlet 12 is opened into conduit 16 and allows gas under pressure to pass into the conduit through chamber 14. Valve means 10 remains in the second state, or in the open valve condition, until it is reactivated to the first state. During reactivation to the first state and the time that it is maintained in the first state before being released therefrom, valve means 10 remains open to provide communication between the gas source outlet 12 and conduit 16.

Another valve means, designated generally at 18, is connected to chamber 14 by a conduit 16' and is operated in response to gas pressure applied thereto through chamber 14 and conduit 16'. Conduit 16' is shown as distinct from conduit 16, although it will be apparent that valve means 18 can be connected directly into conduit 16. An activator 20 is connected to valve means 18 for activating the first valve means 10 from the second state to the first state in response to gas pressure applied thereto as controlled by valve means 18. More particularly, valve means 18 is in a normally opened condition and interconnects chamber 14 with activator 20 when the gas source outlet 12 is initially opened to chamber 14. After a predetermined period of time, valve 18 closes and releases the gas pressure on activator 20 to the atmosphere, thus permitting activator 20 to release the first valve means 10 from the first state to assume the second state. When the first valve means 10 is released from the first activated state, valve means 18 is caused to reopen, or reset itself. This completes the cycle, and the cycle is continuously repeated.

In a preferred embodiment, the first valve means 10 comprises an enclosure 30 having a cylindrical interior chamber 32 of a first diameter provided along a part of the length of the enclosure, and an enlarged diameter cavity 34 communicating with the cylindrical interior chamber 32. Enclosure 30 is closed at the top by any suitable cap 36 but is maintained at atmospheric pressure by not being sealed, whereas the enclosure is sealed at the bottom adjacent the enlarged cavity 34 by means of a flexible diaphragm 38, such as, for example, a neoprene rubber disc. Preferably, the enlarged cavity 34 communicates with diaphragm 38 through a port 40. The chamber and enlarged cavity contain a fluid 31, such as, for example, silicone oil, through which pressure is transmitted for operating valve means 10. Disposed within the cylindrical interior chamber is a piston rod or plunger 42 having a shoulder 43 on the lower end thereof and biased downward to move toward the enlarged cavity 34 by means of a spring 44 disposed about the piston rod between shoulder 43 and cap 36. An extension 45 of the piston rod which includes shoulder 43 extends through a piston 46 of substantially the same diameter as the cylindrical interior chamber 32, wherein an O-ring 47 provides a seal between the piston and the interior wall of the chamber. The opening 48 in the piston through which the piston rod passes has a beveled surface 50 forming a valve seat, and the piston rod below shoulder 43 is provided with a corresponding beveled surface to provide a valve in conjunction with surface 50. The portion 45 of the piston rod that extends through the opening in the piston is of a smaller diameter than the opening itself, so that fluid can flow through the opening in the piston when the valve 45 is moved upward relative to the valve seat 50 in spaced relation therewith.

The lower end of the piston rod is provided with a bore 56 within which there is contained a small, needlelike conduit 52 having a bore 54 therein opening into bore 56 at the top end and into the chamber at the lower end. A filter 53 is provided in the lower end of the conduit to filter fluid that passes from the enlarged cavity 34 through the conduit. A port 58 connects bore 56 with the top side of the piston inside interior chamber 32.

Another chamber 60 is provided intermediate enclosure 30 and chamber 14. An annular clamp 62 having a shoulder 63 is secured to the bottom of enclosure and seals diaphragm 38 to the bottom of the enclosure by means of the shoulder 63. The top of chamber 14 defines an annular upright shoulder 64 which is secured to the bottom of clamp 62 to form chamber 60 by means of shoulders 63 and 64. A port 65 is provided in the base of annular shoulder 64, so that chamber 60 is maintained at atmospheric pressure.

A plate 66 having a recess in the bottom thereof is firmly attached to the bottom side of the diaphragm 38 for movement therewith. Another valve having a plunger 67 extends through an opening 68 having a valve seat 69 provided in chamber 14 between chamber 60 and the interior 70 of chamber 14. This plunger is engaged by plate 66 to be urged downward with the diaphragm so as to open this valve. Another valve comprises another plunger 74 engaged by plunger 67 which extends through a coupling 75 connecting chamber 14 with the source outlet 12. A shoulder 76 forming a valve seat is provided in the coupling and is engaged by plunger 74 when the latter is forced downward by plunger 67 to close this valve. Plunger 74 includes a top shoulder 77, and a spring 78 is disposed about the plunger between this shoulder and valve seat 76 to bias the plunger upward.

When piston 42 is raised to an elevated position in spaced relation from enlarged cavity 34, the fluid contained within the enclosure is allowed to pass from the top side of the piston to bottom side through opening 48 therein, since valve 43 is lifted away from valve seat 50. The elevated position of the piston will also be referred to hereinafter as the first or activated state of valve means 10. With the piston held in the elevated position, no fluid pressure is exerted on diaphragm 38, and spring 78 urges plunger 74 upward to open the gas source to the interior 70 of chamber 14. Plunger 74 also engages plunger 67 to move the latter upward against valve seat 69 to close off chamber 14 from the atmosphere at the top side. Thus gas pressure will be applied to conduits 16 and 16' from the source through chamber 14, and any gas operated mechanism (not shown) connected to conduit 16 will be operated in response thereto.

When piston rod 42 is released from the elevated position, spring 44 will urge it downward to close valve 43 against valve seat 50 of the piston, and piston 46 will be carried downward with the piston rod. As the piston moves downward, pressure is applied against diaphragm 38 through the fluid contained below the piston, thus causing the diaphragm to be deflected downward. The rate of travel of the piston downward is determined by the characteristics and compression of spring 44 and the rate of passage of fluid from the lower side of the piston to the upper side through the conduit 52 and port 58. During the downward travel of the piston, plunger 67 is forced downward by the diaphragm, as is plunger 74 by means of engagement with plunger 67. Plunger 74 closes the valve between the source and chamber 14, and plunger 67 opens the valve between chambers 60 and 14. This releases the pressure within chamber 14 to the atmosphere through port 65 in chamber 60.

Fluid pressure is applied to diaphragm 38 until piston 46 reaches its lowermost position, which position of the piston preferably coincides with enlarged cavity 34, at which time fluid is allowed to pass around the sides of the piston. When this occurs, fluid pressure is released from diaphragm 38, and plungers 67 and 74 again assume the initial elevated positions. Consequently, the gas source is again opened to conduits 16 and 16' through chamber 14. The piston will remain in the lower position, or deactivated state, until activated by some external means. It will be remarked that piston 46 does not have to reach the enlarged cavity 34 before pressure is removed from diaphragm 38. Should the lower position of the piston be limited by some means so that the piston never enters the enlarged cavity, the fluid below the piston will pass more slowly through conduit 52 and port 58, thus eventually releasing the pressure.

Another valve means 18 is connected to conduit 16' for actuation in response to the gas pressure from chamber 14 and provides the connection between chamber 14 and the activator 20. This valve means comprises a chamber 90 which provides communication between conduit 16' and another conduit 110 connecting the activator 20 to the valve means 18, whereby conduit 110 is connected to this valve means through coupling 112 coinciding with a port 114 in chamber 90. A plunger 92 is disposed within chamber 90 and is connected at its upper end to another diaphragm 94 sealing the bottom of a fluid containing chamber 96. Another chamber 97, which is maintained at atmospheric pressure through port 106, is disposed above chamber 96 and separated therefrom by a partition 98 having an opening 99 provided therethrough. A spring 101 is disposed between the top of the diaphragm and partition 98 to bias the diaphragm downward. A valve 100 extends through the opening and is seated against a valve seat 102 of the opening, whereby valve 100 has a shoulder 103 at the top thereof. A spring 104 is disposed about the valve between partition 98 and shoulder 103 biasing the valve upward. A channel 105 is provided through the valve to provide a conduit for the passage of fluid between chambers 96 and 97 when the valve is closed.

Gas pressure is applied to diaphragm 94 through chamber 90 to urge the diaphragm upward against spring 101, compressing the latter. Since fluid is contained within chamber 96, fluid pressure is applied to valve 100 causing it to be firmly seated against the valve seat 102 in conjunction with spring 104. As the diaphragm 94 is deflected upward to raise the plunger 92, fluid is forced from chamber 96 through channel 105 of the valve into chamber 97. When the gas pressure within conduit 16' and chamber 14 is released to the atmosphere, spring 101 causes diaphragm 94 to assume its initial, undeflected position, which creates a vacuum in chamber 96 to cause valve 100 to move downward away from valve seat 102 against the pressure of spring 104. The fluid within chamber 97 flows rapidly back to chamber 96 through opening 99.

The bottom end of chamber 90 is open to the atmosphere through a port 116, and plunger 92 carries with it a piston rod 120 having a piston 118 secured to the lower end thereof for reciprocation in a cylinder 119. The top end of piston rod 120 is screwed into a threaded bore 121 of plunger 92. When the diaphragm 94 is in its initial, undeflected position so that plunger 92 is in its lowermost position, piston 118 is positioned below port 114 and port 114 communicating with conduit 110 is opened to chamber 90 and to conduit 16'. When pressure is applied to diaphragm 94 through conduit 16', plunger 92 is raised and carries with it piston rod 120 and piston 118, so that the piston eventually closes off port 114. As the piston continues to rise beyond port 114, port 114 is opened to the atmosphere through port 116, which releases the pressure from activator 20 through conduit 110. It will be apparent that plunger 92 and diaphragm 94 cannot assume their initial positions until the gas pressure within conduit 16' has been released to the atmosphere, and as previously described, this occurs when diaphragm 38 of the first valve means 10 is deflected downward to open chamber 14 to the atmosphere through chamber 60 and port 65. However, this occurs immediately after the pressure is released from the activator to release the first valve means from its first state. The importance of the pressure being released from diaphragm 94 after being released from activator 20 will also be apparent. Should the pressure release on these members be simultaneous, it would be possible for piston 118 to drop and block off port 114, thus preventing positive release action by the activator. By virtue of the above described operation the various cycle times are maintained accurate. The length of cycle of valve means 18 is determined by screwing piston rod 120 further in or out of threaded bore 121.

The activator 20 connected to valve means 18 through conduit 110 comprises another chamber 130 within which there is disposed an activator rod 132 connected to a piston 134. Piston 134 has substantially the same diameter as the interior of this chamber and includes an O-ring 136 for providing a seal between the piston and the chamber wall. A spring 138 is positioned about the activator rod between an end cap 140 secured to the top of the chamber and the piston 134 to bias the piston downward. A coupling 142 is secured to the bottom of the chamber 130 and provides the connection between the chamber and conduit 110. It will be seen that as gas pressure is applied through fitting 142 to the bottom of piston 134, the activator rod will be moved upward and held in an elevated position until the gas pressure is released, the latter of which occurs when port 114 is opened to the atmosphere. When pressure is initially applied to the activator, it raises piston rod 42 of the first valve means to the elevated position almost instantaneously, but maintains the piston in this position throughout the interval of time that the second valve means requires to complete its stroke.

Piston rod 42 of the first valve means 10 extends through an opening 152 in cap 36, and a flexible cover 154 is employed about the piston rod to prevent dust and other foreign matter from contaminating the fluid within chamber 32. However, cover 154 does not provide an air tight seal and chamber section 32 is maintained at atmospheric pressure through opening 152 which is of larger diameter than the piston rod. Pivotally connected to the top of the piston rod is a lever arm 150 extending laterally beyond chamber 30 and which is engaged at one end by the activator rod 132 when the latter is moved upward. The other end of the lever arm comes to rest on a temperature compensator member 167. The lever 150 is situated within a housing 162 having openings 156 and 158 on opposite sides through which the lever arm is exposed on either end, and within which the lever arm can be raised and lowered. An adjustable stop 160, such as a threaded bolt screwed through the top of housing 162, limits the uppermost position of the piston rod. As pressure is applied to the activator 20, the activator rod 132 engages the lever arm 150 to move the piston within the valve means 10 upward until lever arm 150 engages the stop 160, whereby the other end of the lever arm bears against the temperature compensator member. The activator 20 will maintain the valve in this elevated position, or maintain the valve means 10 in this first activated state, until the gas pressure is released from the activator. During this time, no pressure is applied to diaphragm 38 by piston 46 and chamber 70 is sealed off from chamber 60 and from the atmosphere to retain the gas pressure therein. Gas pressure is also applied to valve means 18 to cause the plunger 92 to continue to move upward until piston 118 is moved across and beyond port 114. Upon this occurrence, the gas pressure on the activator is released, thus causing the activator rod 132 and piston 134 to be moved downward by spring 138. When this occurs, spring 44 urges piston rod 42 and piston 46 downward to apply fluid pressure on diaphragm 38. Deflection of the latter causes chamber 70 to be opened to the atmosphere through port 65 in chamber 60, thus releasing gas pressure from valve means 18 to allow it to assume its initial state. When piston 46 reaches cavity 34, pressure is again released from diaphragm 38, chamber 70 is closed off and opened to the gas source through source inlet 12, and the cycle is repeated.

It will be apparent that an interval of time is required for valve means 10 to assume its second deactivated state after being released from its first activated state. This time interval depends upon the characteristics of the fluid within chamber 32 (primarily the viscosity of the fluid), the pressure exerted by spring 44 against the piston 46, the area of piston 46, the area of conduit 54 and the distance the piston must travel from its elevated position to the enlarged cavity 34. All of these factors can be adjusted as desired to provide the desired predetermined interval of time during which the gas source inlet 12 is closed off to chamber 70. This time interval can be both lengthened or shortened by adjusting stop 160 to change the distance of travel of the piston 46. It will also be apparent that an interval of time is required for the second valve means 18 to move upward the distance required to open port 114 to the atmosphere. Similar factors govern this interval of time, whereby this valve means can be constructed to provide the desired predetermined interval of time during which the gas source inlet 12 is opened to chamber 70. Typical time intervals and other characteristics will be enumerated hereinafter in conjunction with a particular application of the actuator.

A temperature compensator 164 is employed to maintain the time interval and cycle of the actuator constant with variations in ambient temperature which would affect the viscosity of the fluid in the various chambers and other operating parameters. The temperature compensator comprises a bimetallic strip of two dissimilar metals 165 and 166 secured to a support member 170, the latter of which is secured to the outside of enclosure 30 and includes a flange 171 extending into opening 158. The compensator has a wedge shape member 167 pivotally attached to the top of the bimetallic strip, wherein the flat side of the wedge rides along the top of flange 171. One end of the lever arm bears on the upper slanted surface of the wedge member during the downward stroke and also on the upward stroke when activator rod 132 engages the other end of the lever arm. The wedge member will move toward or away from the lever arm as the temperature changes to change the height on the slanted surface at which the lever arm engages the wedge member. As the wedge member moves, it remains flush against the support flange 171 so that no strain is exerted thereon by the lever arm 150. The downward stroke of the piston can be limited by the wedge member and the top of activator rod 132 against both of which the lever arm comes to rest. Thus the length of the piston stroke is changed slightly for lateral movements of the wedge member, thus compensating for viscosity changes in the fluid as a function of temperature. The net result is to maintain the time cycle constant. However, the piston can be allowed to drop all the way through the enlarged cavity (the lever arm never coming to rest on the activator rod on the downward stroke), since the stop 160 also determines the length of the piston stroke, depending upon its adjustment as to what height the lever arm engages it on the upward stroke. The lateral position of the wedge member 167 also determines the maximum height on the upward stroke.

One application of the actuator just described is to automatically control the production of oil from a well by gas lifting of the oil within the well pipe. In this type of production, gas from a pressurized source is forced down into the well between the well casing and the oil pipe and enters the pipe through perforations therein. Normally, a very high pressure source of natural gas is used for this purpose and must be intermittently controlled to the well by a suitable valve. The actuator of the invention can be used to control the valve supplying the high pressure gas to the well, such as another diaphragm valve actuated by fluid pressure. The actuator itself would be operated off of a lower pressure gas source, such as could be derived from the high pressure source through a pressure regulator or attenuator, and conduit 16 would be interconnected with the high pressure diaphragm valve to actuate the diaphragm therein.

The actuator is also adapted for use as a pump for liquids as shown in FIGURE 2, which embodiment will be described with reference to the pumping of a liquid chemical into an oil collector station. The chemical promotes the separation of the oil as it comes from the well into oil, gas and water as is well known to those familiar with oil field operations. Such chemicals are generally expensive and should be admitted to the oil at a precisely controlled rate so as to achieve not only a sufficient separation but to prevent waste. As shown in FIGURE 2, the system comprises a first valve means 10 and an activator 20 attached to the side thereof which operates as previously described. A second valve means 180 is connected directly into conduit 16 and is also connected to the activator. The second valve means operates in conjunction with the first valve means and activator to provide the same function as before, but also provides the function of a pump for the liquid chemical.

The second valve means 180 comprises an enclosure 182 defining a first cylindrical interior chamber 190 having a first diameter and a second cylindrical interior chamber 192 of smaller diameter communicating therewith. Enclosure 182 is sealed at the bottom by a base member 194 having an opening 195 therethrough leading into a lower extension 207 of the base member. A piston 196 is disposed within enclosure 182 for reciprocation therein and includes first and second piston heads 197 and 198 for reciprocation within chambers 190 and 192, respectively. The two piston heads are spaced apart but rigidly interconnected by the body of piston 196 and include O-rings 199 and 200 provided about the edges thereof to effect seals between the piston heads and the walls of the respective chambers.

A bore 201 is provided in the main piston body 196 and opens into chamber 190 through piston head 197, and a piston rod 202 extends into the bore with a shoulder or nut 203 adjacent the top end thereof. A sleeve 204 is inserted within the bore about the rod to limit the extent that the rod can move out of the bore by means of the nut engaging the shoulder of the insert sleeve. Rod 202 also extends through opening 195 into lower extension 207 and includes a piston 208 on the bottom end thereof for reciprocation within a cylindrical chamber 210 at the lower end of the lower extension. Chamber 210 is open to the atmosphere at the bottom thereof through a port 212 having an annular shoulder 211 against which the piston 208 comes to rest in its lowermost position. A conduit 213 connects the activator 20 to chamber 210 through another port 216 spaced intermediate of chamber 210. Piston 196 is adapted to move up and down within enclosure 182 and will carry rod 202 and piston 208 upward therewith when the sleeve 204 engages nut 203 of rod 202 on the upward travel. The piston 208 functions in the same manner as previously described with reference to valve means 18 of FIGURE 1, whereby activator 20 is connected to conduit 16 through chamber 190, opening 195 and lower extension 207 when piston 196 is in the lower position. As the piston is caused to rise within the enclosure, piston 208 will close off port 216 and thereafter open this port to the atmosphere through port 212. Enclosure 182 is connected to conduit 16 through opening or port 220, so that as gas pressure is applied to conduit 16, it will cause piston 196 to be moved upward in response thereto. As piston 196 moves down, rod 202 will remain stationary until the top of bore 201 engages the top of the rod to urge the latter downward.

The enclosure 182 also includes an upright neck 224 having an annular interior shoulder 225 intermediate the length thereof through which an opening 226 provides communication with another chamber 232. A spring 228 is disposed between shoulder 225 and the top of piston head 198 to bias piston 196 downward, and is compressed when piston 196 is raised by the gas pressure applied from conduit 16. Chamber 232 is connected to a reservoir (not shown) of a liquid, such as the liquid chemical above referred to, through a coupling 230, wherein a check valve comprising ball 234 and valve seat 236 formed in the top of chamber 232 is employed to close off the liquid reservoir from chamber 232 when upward pressure is applied to ball 234. Neck 224 includes an outlet 238 through a port 239 spaced below chamber 232 annd port 226. Connected to the outlet is another coupling 241 defining a chamber 240 therein which includes another check valve comprising ball 242 and valve seat 244 formed adjacent port 239. A conduit 250 is connected to chamber 240 through which the liquid chemical is transmitted to a chemical applicator to be described below.

Assuming that the piston of the first valve means 10 is moving from its elevated position to its lowermost position, the gas source outlet 12 will be closed off from conduit 16 and chamber 14. Chamber 14 and conduit 16 will then be opened to the atmosphere and no pressure is applied to the bottom head 197 of piston 196. Consequently, spring 288 will urge piston 196 to its lowermost position. In so doing, a vacuum will be created above piston head 198 and in chamber 232, so that check valve 234 opens and check valve 242 closes. Liquid is then drawn through coupling 230 into chamber 232 on top of piston head 198. When the piston within the first valve means 10 attains its lowermost position, gas source outlet 12 is opened to chamber 14 and conduit 16 to apply pressure from the gas source to the bottom piston head 197, causing this piston to be driven upward to apply fluid pressure through the liquid chemical to chamber 232 to close check valve 234 and open check valve 242. The upward motion of the piston forces the fluid through port 239 and conduit 250. Gas pressure is also applied from conduit 16 through the second valve means and conduit 213 to activator 20, so that the piston within the first valve means 10 is again activated to its elevated position. Piston 196 continues to move upward and activator 20 maintains the piston within the first valve means 10 in the elevated position until sleeve 204 engages nut 203 of the piston rod to carry piston 208 past port 216. Upon this occurrence, conduit 213 is opened to the atmosphere to release the pressure from activator 20, and thus the piston within the first valve means is again released from its elevated position. This causes the pressure to be released from chamber 14 and conduit 16 to allow piston 196 to move downward in response to the compression of spring 228.

Piston 196 has been shown having two heads of different areas, wherein the gas pressure to raise the piston is applied to the larger area head and the liquid chemical is forced through conduit 250 by means of pressure created by the smaller area piston head. Since the same force is exerted on face 198 as applied to face 196, it will be apparent that the pressure applied to the liquid chemical is greater than the pressure applied to piston face 197 by the gas. The purpose of this is to insure that the liquid chemical is forced through conduit 250 with a sufficient amount of pressure. It will be understood, however, that the relative areas of the piston heads can be changed for whatever application desired.

A chemical applicator 252 is also shown in FIGURE 2 for use in conjunction with the actuator just described, whereby the chemical applicator is adapted to add chemical to an oil line 253 at a precisely controlled rate. The applicator comprises a reservoir 254 into which a liquid chemical 255 is pumped. A stand pipe 256 is contained within reservoir 254 and extends both above the level of the liquid and below the bottom of the reservoir to terminate adjacent line 253. A base member 258 is employed to mount the reservoir 254 to line 253 and to which conduit 250 is connected, wherein stand pipe 256 is held within the base 258 at the lowermost end thereof against an annular beveled shoulder 290. A port 260 in line 253 provides an opening between the conduit and the interior 257 of the stand pipe. The stand pipe includes a plurality of relatively large diameter ports 262 defined through the walls thereof in an elevated position above the bottom of reservoir 254. A plurality of intermediate diameter ports 264 are defined through the walls of the stand pipe below ports 262, and a plurality of relatively small diameter ports 266 are defined through the wall of the stand pipe at a position spaced below ports 264 but above the bottom of the reservoir. Only three sets of ports are shown, although a greater or lesser number of groups of ports can be employed.

Conduit 250 communicates with the base 258 and reservoir 254 through port 272 defined in the base opening into the interior 270 thereof, wherein the walls of the base interior chamber 270 are spaced about stand pipe 256. As liquid chemical is pumped through conduit 250 and forced into reservoir 254 through the base member 258, the liquid chemical passes through the various ports 262, 264 and 266 at controlled rates as determined by the areas of the ports and the height of the liquid chemical within the reservoir. In the case where the applicator is used to inject chemical into an oil collector station, the pump or second valve means 180 pumps a predetermined volume of chemical into reservoir 254 during each cycle of the actuator, wherein substantially all of this volume of chemical is added to conduit 253 during the time that the actuator recycles. Thus the reservoir is refilled during each cycle.

In the event that foreign matter is present in the liquid chemical, means is employed to insure that ports 262, 264 and 266 do not become clogged or stopped up to impede the flow of chemical through the stand pipe. To accomplish this, a cylindrical buoyant device 280 having an inside diameter at the lower end thereof substantially equal to the outside diameter of the stand pipe is disposed about the stand pipe for sliding movement thereabout. A cylindrical screen member 281 is provided on the interior wall thereof adjacent the lower end. The device also defines an upper interior recessed section 282 spaced from the stand pipe, and an annular screen member 283 is provided at the upper end of the recessed section on the interior thereof. The buoyant device assumes the position as shown when the chemical is depleted within the reservoir, but as liquid is pumped into the reservoir, the device is buoyed up about the stand pipe. In so doing, the two screen members scrape across the ports 262, 264 and 266 to remove any obstructions, with the upper screen member 283 being provided to scrape across the most elevated ports. The buoyant action is created by air being trapped between the device and the stand pipe, especially in recessed section 282, when the liquid initially enters the reservoir. Eventually, the float will sink back to its original position or ride down on top of the liquid as the level drops. As one example, the main body 280 can comprise any suitable plastic and the screen member 282 can comprise any suitable screen mesh. The specific gravity of this device is very nearly equal to the specific gravity of the liquid chemical, although it will be seen that this device can also have a specific gravity greater than that of the chemical, since the trapped air provides the buoyant force.

A handle 292 is connected to the open top of the stand pipe through a pin 294 and extends through a cap 296 which seals the reservoir off from the atmosphere. Thus the pressure within the reservoir is equal to the pressure in the oil line 253, so that the chemical will flow into the line. The oil line pressure is substantially greater than atmospheric pressure, so that the liquid chemical must be pumped into the reservoir with at least an equal pressure. The piston head 198 of valve means 180 serves this purpose. A spring 298 is disposed between the top of the reservoir and the top of the stand pipe to bias the latter against the beveled seat 290 to hold it in place. Should the feed ports within the stand pipe become clogged up, the chemical will flow over the top of the stand pipe and spill into the oil line, thus precluding any interruption of operation. Should it be desirable to allow the liquid chemical to flow into the oil line at a faster rate during each cycle, the handle 292 is raised to space the bottom of the stand pipe from the beveled seat 290.

The various piston areas of the actuators can take on a wide range of relative sizes to effect different pressure differentials between the various chambers. For example, a chemical applicator may be required to apply chemical to an oil line, the latter of which may be under several thousands of pounds pressure. However, the actuator itself can be constructed to operate on a pressure several orders of magnitude less. This can be done by selecting the proper area ratio for the piston heads of the pump 180 as shown in FIGURE 2.

The time cycle and intervals of the apparatus can also be varied widely. Typical characteristics for a chemical pump are to deliver or pump 1 to 2 quarts of chemical per 24 hour period. Typically, a time interval of about 40 minutes is used for the downstroke of the actuator piston (time that gas source is closed off to pump), whereas a time interval of about 15 seconds is used to allow the gas source to operate the pump. The various volumes and areas of the apparatus can be calculated depending upon the pressure differentials encountered and to result in the proper volume of chemical delivered per unit of time.

Although the invention has been described with reference to particular embodiments thereof, there are many modifications and substitutions that do not depart from the true scope of the invention that will undoubtedly occur to those skilled in the art. Accordingly, it is intended that the invention be limited only as defined in the appended claims.

What is claimed is:

1. An actuator adapted for connection to a source of pressurized fluid for recurrently releasing said fluid from said source, comprising:
   (a) first means having a chamber for connection to said source adapted for activation to a first state from which it can be released so as to assume a second state a first predetermined interval of time after being released from said first state,
   (b) said first means being effective to maintain said source closed off from said chamber during said first interval of time and to open said source to said chamber when said second state is assumed, and
   (c) second means connected to said chamber of said first means responsive to said fluid under pressure when released into said chamber from said source to activate said first means from said second state to said first state a second predetermined interval of time after said source is opened.

2. An actuator as set forth in claim 1 wherein said second means comprises third means connected to said first means responsive to fluid pressure for activating said first means from said second state to said first state and for maintaining said first means in said first state so long as fluid pressure is applied thereto, and fourth means interconnecting said third means with said chamber of said first means to apply fluid pressure from said chamber to said third means when said source is opened and responsive to said fluid pressure in said chamber to release said fluid pressure from said third means after said second interval of time.

3. An actuator as set forth in claim 1 wherein said first means opens said chamber to the atmosphere to release the fluid pressure therein during said first predetermined interval of time when said first means is released from said first state to assume said second state.

4. An actuator as set forth in claim 2 wherein said first means opens said chamber to the atmosphere to release the fluid pressure therein and from said fourth means during said first interval of time when said first means is released from said first state to assume said second state, and said forth means opens said third means to the atmosphere to release the fluid pressure thereon after said second interval of time.

5. An actuator as set forth in claim 1 wherein said first means includes a normally open valve for connecting said chamber to said source, pressure responsive means for engaging and closing said normally open valve when pressure is applied thereto, and pressure generating means for applying pressure to said pressure responsive means during said first time interval.

6. An actuator adapted for connection to a source of pressurized fluid for recurrently releasing said fluid from said source, comprising:
   (a) a chamber,
   (b) first valve means for connecting said chamber to said fluid source adapted for activation to a first state to assume a second state a first predetermined interval of time after being released from said first state to close off said source from said chamber during said first interval of time and to open said source to said chamber when said second state is assumed,
   (c) activator means connected to said first valve means responsive to fluid pressure applied thereto to activate said first valve means from said second state to said first state, and
   (d) second valve means connecting said activator means to said chamber through which fluid pressure is applied to said activator means and responsive to said fluid pressure applied thereto from said chamber to release the pressure from said activator means a second predetermined interval of time after said first valve means opens said source to said chamber.

7. An actuator as set forth in claim 6 wherein said first valve means comprises a valve for releasing the fluid pressure from said chamber during said first interval of time to allow said second valve means to open said chamber to said activator means.

8. An actuator as set forth in claim 6 wherein said first valve means comprises an enclosure containing liquid having a diaphragm sealing one end thereof, first piston means disposed in said enclosure biased to move through said liquid toward said diaphragm from a first position to a second position and to produce pressure to actuate said diaphragm, and a first normally open valve for connecting said chamber with said source engaged by said diaphragm when said diaphragm is actuated to close off said chamber from said source; said activator means comprises second piston means for engaging said first piston means to return said first piston means from said second position to said first position when fluid pressure is applied thereto; and said second valve means comprises pressure responsive means actuated by said fluid pressure from said chamber, and a second normally open valve connecting said activator means with said chamber coupled to said pressure responsive means to close off said activator means from said chamber when said second diaphragm is actuated.

9. An actuator as set forth in claim 8 wherein said second normally open valve comprises a cylinder, a first port defined in said cylinder through which fluid pressure from said chamber is applied to said activator means, a second port defined in said cylinder opening to the atmosphere, and third piston means connected to said pressure responsive means for moving past said first port to connect said first port with said second port after said second predetermined interval of time so that; said activator releases said first piston means from said first position to move to said second position, and said first valve means comprising third valve means for releasing the fluid pressure from said chamber and said pressure responsive means when said first valve closes off said chamber from said source.

10. An actuator as set forth in claim 8 wherein said enclosure defines a cylindrical interior sleeve and an enlarged cavity into which said sleeve opens, said diaphragm seals said enclosure adjacent said enlarged cavity opposite said sleeve; and said first piston means includes a first piston having a diameter substantially equal to the interior diameter of said sleeve and is biased to move within said sleeve from said first position spaced from said enlarged cavity toward said diaphragm to produce fluid pressure on said diaphragm to said second position in said enlarged cavity to release fluid pressure from said diaphragm, said first piston means including a third valve for the passage of fluid within said enclosure from one side of said first piston to the other side thereof which is biased shut when said first piston moves toward said diaphragm within said sleeve, and a conduit defined in said first piston means to pass fluid within said enclosure from one side of said first piston to the other side thereof when said first piston moves toward said diaphragm.

11. An actuator as set forth in claim 6 wherein said first valve means comprises a second chamber containing liquid having a first diaphragm sealing one end thereof, a first piston disposed in said second chamber biased to move through said liquid toward said first diaphragm from a first position to second position to produce fluid pressure to actuate said first diaphragm, and a first normally biased opened valve for connecting said first mentioned chamber with said source engaged by said first diaphragm when said first diaphragm is actuated to close off said first mentioned chamber from said source; said activator means comprises a second piston adapted to engage said first piston to return said first piston from said second position to said first position when fluid pressure is applied thereto; and said second valve means comprises a third chamber containing liquid having first and second compartments connected by a conduit through which liquid may pass, a second diaphragm sealing one end of said third chamber forming one wall of one of said first and said second compartments and against which said fluid pressure from said chamber is applied to actuate said second diaphragm, and a second normally open valve connecting said activator means with said first mentioned chamber coupled to said second diaphragm to close off said activator means from said first mentioned chamber when said second diaphragm is actuated.

12. An actuator as set forth in claim 1 wherein said second means comprises another chamber, a piston disposed in said another chamber for reciprocation therein for actuation in response to said fluid pressure when released into said first mentioned chamber, and valve means for connecting said another chamber with a source of liquid responsive to the actuation of said piston for operation thereby.

13. An actuator as set forth in claim 12 including a liquid applicator connected to said valve means comprising a reservoir into which said liquid is pumped through said valve means in response to the actuation of said piston, and a stand pipe disposed within said reservoir extending through the bottom thereof, said stand pipe defining a plurality of ports through the walls thereof through which said liquid passes from said reservoir to the interior of said stand pipe.

14. A time cycle liquid pump system adapted for connection to a source of liquid to be pumped and a source of pressurized gas for operation on a time cycle basis in response to said pressurized gas, comprising:
  (a) a first chamber,
  (b) first valve means for connecting said first chamber to said gas source adapted for activation to a first state to assume a second state a first predetermined interval of time thereafter to close off said gas source from said first chamber during said first interval of time and to open said gas source to said first chamber when said second state is assumed,
  (c) activator means connected to said first valve means responsive to gas pressure applied thereto to activate said first valve means from said second state to said first state,
  (d) a second chamber interconnected with said first chamber,
  (e) piston means disposed within said second chamber for reciprocation therein biased to move in one direction of its stroke to a first position and responsive to said gas pressure applied to said second chamber from said first chamber to move in an opposite direction of its stroke to a second position,
  (f) second valve means coupled to said piston means for actuation thereby and interconnecting said activator means with said first chamber,
  (g) said piston means adapted to open said second valve means when biased to said first position to apply gas pressure to said activator means when said gas source is opened to said first chamber and adapted to move to said second position a second predetermined interval of time after said gas source is opened to said first chamber to close said second valve means to release said gas pressure from said activator means, and
  (h) third valve means including an outlet for interconnecting said second chamber with said liquid source,
  (i) said third valve means operatively connected to said piston means for being opened and closed by said piston means during each cycle thereof to pump liquid from said liquid source through said outlet.

15. A pump system according to claim 14 wherein said third valve means includes means for opening said liquid source to said second chamber and for closing said outlet when said piston means is biased to move to said first position to draw liquid from said liquid source into said second chamber, and for closing off said liquid source from said second chamber and for opening said outlet when said piston means moves to said second position in response to said gas pressure to force said liquid through said outlet.

16. A pump system according to claim 14 including fourth valve means for opening said first chamber to the atmosphere during said first interval of time.

17. A pump system according to claim 14 including a liquid applicator connected to said outlet comprising a reservoir into which said liquid is pumped through said outlet, and a stand pipe disposed within said reservoir extending through the bottom thereof, said stand pipe defining a plurality of ports through the walls thereof through which said liquid passes from said reservoir to the interior of said stand pipe.

18. A liquid applicator adapted for connection to a receptacle to which the liquid is applied at a controlled rate, comprising:
  (a) a reservoir into which said liquid can be supplied,
  (b) a stand pipe disposed within said reservoir extending through the bottom thereof for communication with said receptacle,
  (c) said stand pipe defining a plurality of ports through the walls thereof through which said liquid passes from said reservoir into the interior and out the bottom of said stand pipe into said receptacle, and
  (d) buoyant member disposed about said stand pipe for movement up and down thereabout, said buoyant member being buoyed up about said stand pipe when liquid is pumped into said reservoir to pass over said plurality of ports in contact therewith.

19. A liquid applicator as set forth in claim 18 wherein said plurality of ports are disposed at spaced positions in the wall of said stand pipe between the top thereof and the bottom of said reservoir with said plurality of ports being graduated in size from larger to smaller from the top of said stand pipe, said buoyant member having abrasive means disposed adjacent said stand pipe for contacting said plurality of ports.

20. A liquid applicator as set forth in claim 19 including a base member for connection to said receptacle on which said reservoir is supported and through which said liquid is pumped into said reservoir, said base member having an annular seat against which said stand pipe is supported and through which said stand pipe opens into said receptacle, and means disposed between a sealed top of said reservoir and said stand pipe for biasing said stand pipe against said seat.

References Cited

UNITED STATES PATENTS

| | | | |
|---|---|---|---|
| 994,333 | 6/1911 | Orth et al. | 222—62 |
| 2,163,436 | 6/1939 | Raymond et al. | |
| 2,598,528 | 5/1952 | French | 103—48 X |
| 3,012,513 | 12/1961 | Knox | 103—52 |

ROBERT M. WALKER, *Primary Examiner.*